US012639235B2

(12) United States Patent
Keskin et al.

(10) Patent No.: US 12,639,235 B2
(45) Date of Patent: May 26, 2026

(54) CROSS-DOMAIN VOLTAGE BUS RESOURCE SHARING FOR IMPROVED POWER DELIVERY NETWORK

(71) Applicant: QUALCOMM Incorporated, San Diego, CA (US)

(72) Inventors: Mustafa Keskin, San Diego, CA (US); Guoqing Miao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 18/456,981

(22) Filed: Aug. 28, 2023

(65) Prior Publication Data

US 2025/0077445 A1     Mar. 6, 2025

(51) Int. Cl.
*G06F 13/16*          (2006.01)
(52) U.S. Cl.
CPC ................................ *G06F 13/1652* (2013.01)
(58) Field of Classification Search
CPC .................................................. G06F 13/1652
USPC ......................................................... 710/113
See application file for complete search history.

(56) References Cited

U.S. PATENT DOCUMENTS

| | | | | |
|---|---|---|---|---|
| 2012/0153723 A1* | 6/2012 | Van Dijk | .................. | G05F 1/56 |
| | | | | 307/31 |
| 2013/0229055 A1* | 9/2013 | Trumbo | ................... | H02H 9/04 |
| | | | | 361/111 |
| 2022/0320999 A1* | 10/2022 | Marchais | ................ | H02J 7/007 |
| 2023/0163098 A1* | 5/2023 | Elsherbini | ........... | H01L 25/0652 |
| | | | | 257/532 |
| 2023/0170794 A1* | 6/2023 | Shenoy | ............... | H02M 1/0003 |
| | | | | 323/371 |
| 2024/0411334 A1* | 12/2024 | Lin | ..................... | G11C 13/0038 |

* cited by examiner

*Primary Examiner* — Chun Kuan Lee
(74) *Attorney, Agent, or Firm* — Loza & Loza LLP

(57)          ABSTRACT

An apparatus, including: a first core; a first voltage bus coupled to the first core; a second core; a second voltage bus coupled to the second core; a bus resource coupled or selectively coupled to the first voltage bus, and selectively coupled to the second voltage bus; and a control circuit configured to: couple the bus resource to the first voltage bus and decouple the bus resource from the second voltage bus based on a first mode; and couple the bus resource to the second voltage bus based on a second mode.

27 Claims, 7 Drawing Sheets

100

200

1100

1170

| TSK$_i$=Frame Transfer | TSK$_{i+1}$=Download | TSK$_{i+2}$=Gaming |
|---|---|---|
| VDD_DDR → P1 | VDD_DDR → P1 | VDD_DDR → P3 |
| VDD_NSP → P3 | VDD_NSP → P3 | VDD_NSP → P1 |
| VDD_MM → P1 | VDD_MM → P1 | VDD_MM → P1 |
| VDD_IO → P3 | VDD_IO → P1 | VDD_IO → P3 |
| VDD_RF → P3 | VDD_RF → P1 | VDD_RF → P1 |
| VDD_GPU → P2 | VDD_GPU → P2 | VDD_GPU → P1 |
| VDD_SCR → P0 | VDD_SCR → P0 | VDD_SCR → P0 |

CROSS-DOMAIN VOLTAGE BUS RESOURCE SHARING FOR IMPROVED POWER DELIVERY NETWORK

FIELD

Aspects of the present disclosure relate generally to power delivery networks (PDNs) for integrated circuits (ICs), such as system on chip (SoC), and in particular, to a cross-domain voltage bus resource sharing for improved PDN.

BACKGROUND

An integrated circuit (IC), such as a system on chip (SoC), typically includes a set of cores (e.g., subsystems or circuits), such as a central processing unit (CPU), graphics processing unit (CPU), memory, neural signal processor (NSP), radio frequency (RF) transceiver, modem, input/output (I/O) core, security core, etc. A power management integrated circuit (PMIC) typically provides a set of supply voltages on a set of voltage buses coupled to the set of cores, respectively. The stability of the set of supply voltages including mitigating voltage transients therein is of interest in such power delivery network (PDN).

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

An aspect of the disclosure relates to an apparatus. The apparatus includes: a first core; a first voltage bus coupled to the first core; a second core; a second voltage bus coupled to the second core; a bus resource coupled or selectively coupled to the first voltage bus, and selectively coupled to the second voltage bus; and a control circuit configured to: couple the bus resource to the first voltage bus and decouple the bus resource from the second voltage bus based on a first mode; and couple the bus resource to the second voltage bus based on a second mode.

Another aspect of the disclosure relates to a method. The method includes: coupling a bus resource of a first voltage bus to a second voltage bus in response to an actual or predicted voltage transient on the second voltage bus; and decoupling the bus resource from the second voltage bus in response to an absence of the actual or predicted voltage transient on the second voltage bus.

Another aspect of the disclosure relates to an apparatus. The apparatus includes: a power management integrated circuit (PMIC) including first and second voltage regulators; a first voltage bus coupled to the first voltage regulator of the PMIC; a second voltage bus coupled to the second voltage regulator of the PMIC; a first core coupled to the first voltage bus; a second core coupled to the second voltage bus; a bus resource coupled or selectively coupled to the first voltage bus, and selectively coupled to the second voltage bus; and a control circuit configured to: couple the bus resource to the first voltage bus and decouple the bus resource from the second voltage bus based on a first mode; and couple the bus resource to the second voltage bus based on a second mode.

Another aspect of the disclosure relates to an apparatus. The apparatus includes: a first core; a first voltage bus coupled to the first core; a second core; a second voltage bus coupled to the second core; a bus resource coupled or selectively coupled to the first voltage bus, and selectively coupled to the second voltage bus; and a control circuit configured to couple the bus resource to the first voltage bus and decouple the bus resource from the second voltage bus based on a first priority allowing the first core to share the bus resource and a second priority allowing the second core to borrow the bus resource from the first core.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the description implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
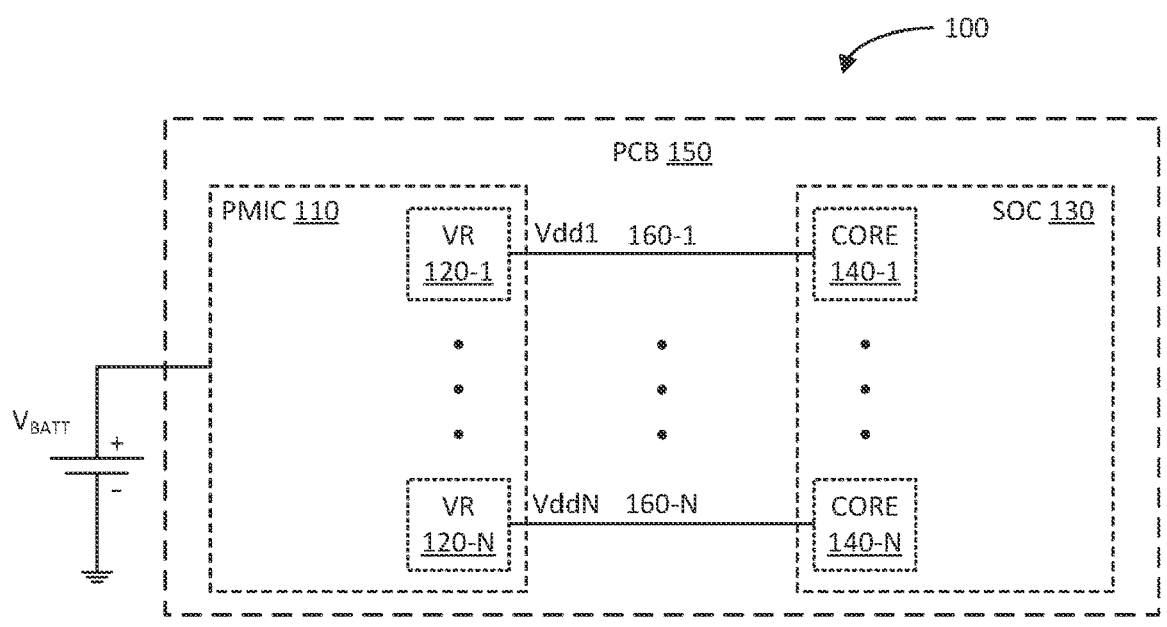
FIG. 1 illustrates a block diagram of an example power delivery network (PDN) in accordance with an aspect of the disclosure.

FIG. 1 illustrates a block diagram of an example power delivery network (PDN) 100 in accordance with an aspect of the disclosure. The PDN 100 includes a battery $V_{BATT}$, a power management integrated circuit (PMIC) 110, and a system on chip (SoC) 130, where the PMIC 110 and SoC 130 may be mounted on a printed circuit board (PCB) 150. The PMIC 110 includes a set of voltage regulators (VRs) 120-1 to 120-N configured to generate a set of supply voltages Vdd1 to VddN based on the voltage $V_{BATT}$ generated by the battery. As an example, the set of voltage regulators (VRs) 120-1 to 120-N may include switching regulators (SRs), low-dropout (LDO) regulators, and/or other types of voltage regulators.

The SoC 130, in turn, includes a set of cores (e.g., subsystems or circuits) 140-1 to 140-N. For example, the set of cores 140-1 to 140-N may include a multimedia (MM) core, a neural signal processing (NSP) core, a graphics processing unit (GPU) core, a central processing unit (CPU) core, a security core, a radio frequency (RF) core, an input/output (I/O) core, and/or other cores. The set of cores 140-1 to 140-N of the SoC 130 may be coupled to the set of voltage regulators (VRs) 120-1 to 120-N via a set of transmission lines 160-1 to 160-N on the PCB 150, respectively. Accordingly, for power delivery purpose, the set of cores 140-1 to 140-N may receive the set of supply voltages Vdd1 to VddN from the set of voltage regulators (VRs) 120-1 to 120-N via the set of transmission lines 160-1 to 160-N, respectively.

Figure 2:
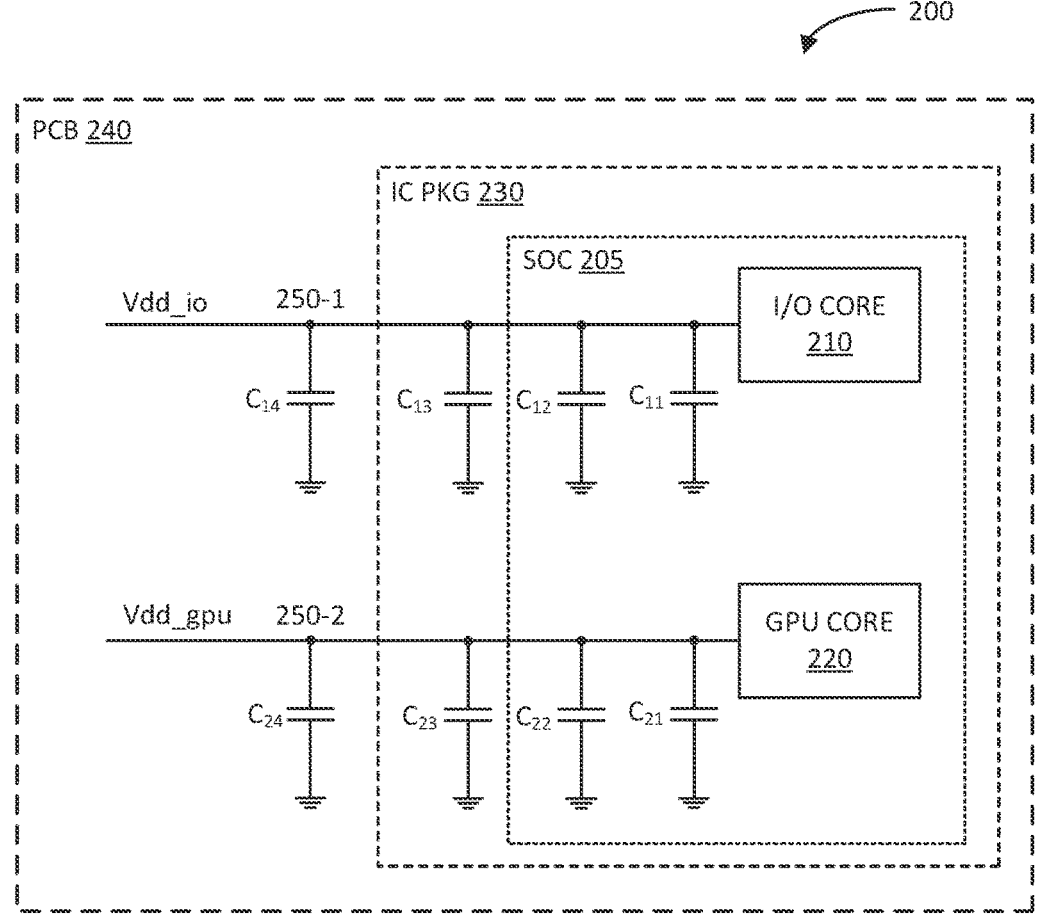
FIG. 2 illustrates a block/schematic diagram of another example power delivery network (PDN) in accordance with another aspect of the disclosure.

FIG. 2 illustrates a block/schematic diagram of another example power delivery network (PDN) 200 in accordance with another aspect of the disclosure. The PDN 200 may be an example more detailed implementation of the SoC 130 side of the PDN 100 previously discussed. In particular, the PDN 200 includes a system on chip (SoC) 205, an integrated circuit (IC) package 230, and a printed circuit board (PCB) 240. The SoC 205 may be mounted to and within the IC package 230; and the IC package 230, in turn, may be mounted on the PCB 240.

In this example, the SoC 205 includes an input/output (I/O) core 210 and a graphics processing unit (GPU) core 220. It shall be understood that the SoC 205 may include other different types of cores or a different set of cores. The I/O core 210 is coupled to a voltage (power) bus (rail) 250-1 to receive a supply voltage Vdd_io from, for example, a voltage regulator (VR) of a power management integrated circuit (PMIC), such as PMIC 110. Similarly, the GPU core

220 is coupled to a voltage bus 250-2 to receive a supply voltage Vdd_gpu from, for example, another voltage regulator (VR) of the PMIC.

The steadiness or stability of the supply voltages Vdd_io and Vdd_gpu is of concern for proper operations of the I/O core 210 and GPU cores 220, respectively. If the supply voltages Vdd_io and Vdd_gpu are subjected to voltage transients (e.g., voltage droops, glitches, spikes, undershoots, overshoots, and/or other voltage artifacts) due to different load demands from the I/O core 210 and GPU core 220 (as well as other sources of noise), the voltage transients may cause problems for the I/O core 210 and GPU core 220, respectively. For example, such problems may cause a collapse of the SoC 205, as well as failed operations of the I/O core 210 and GPU core 220, and/or other cores of the SoC 205.

To mitigate voltage transients on the voltage buses 250-1 to 250-2, the PDN 200 may include various decoupling capacitors. For example, the SoC 205 includes a first set of one or more on-chip decoupling capacitors $C_{11}$ and $C_{12}$ coupled between the Vdd_io voltage bus 250-1 and ground (a negative voltage rail), and a second set of one or more on-chip decoupling capacitors $C_{21}$ and $C_{22}$ coupled between the Vdd_gpu voltage bus 250-2 and ground. Further, in this regard, the IC package 230 may include a first set of one or more IC package (off-chip) decoupling capacitors $C_{13}$ coupled between the Vdd_io voltage bus 250-1 and ground, and a second set of one or more IC package (off-chip) decoupling capacitors $C_{23}$ coupled between the Vdd_gpu voltage bus 250-2 and ground. In a similar vein, the PCB 240 may include a first set of one or more PCB (off-chip and off-package) decoupling capacitors $C_{14}$ coupled between the Vdd_io voltage bus 250-1 and ground, and a second set of one or more PCB (off-chip and off-package) decoupling capacitors $C_{24}$ coupled between the Vdd_gpu voltage bus 250-2 and ground.

For example, if there is a sudden high load demand from the I/O core 210, the supply voltage Vdd_io may experience a voltage transient in the form of a voltage droop. As the decoupling capacitors $C_{11}$, $C_{12}$, $C_{13}$, and $C_{14}$ are charged to the specified supply voltage Vdd_io, the voltage droop causes a discharging of the decoupling capacitors $C_{11}$, $C_{12}$, $C_{13}$, and $C_{14}$ to provide charges to the Vdd_io voltage bus 250-1 to counter the voltage drop. Similarly, if there is a sudden reduction in the load demand from the I/O core 210, the supply voltage Vdd_io may experience a voltage transient in the form of a voltage spike or overshoot. As the decoupling capacitors $C_{11}$, $C_{12}$, $C_{13}$, and $C_{14}$ are charged to the specified supply voltage Vdd_io, the voltage overshoot causes a charging of the decoupling capacitors $C_{11}$, $C_{12}$, $C_{13}$, and $C_{14}$ to remove charges from the Vdd_io voltage bus 250-1 to counter the voltage overshoot. In a similar manner, the decoupling capacitors $C_{21}$, $C_{22}$, $C_{23}$, and $C_{24}$ provide voltage transient mitigation for the Vdd_gpu voltage bus 250-2.

Figure 3:
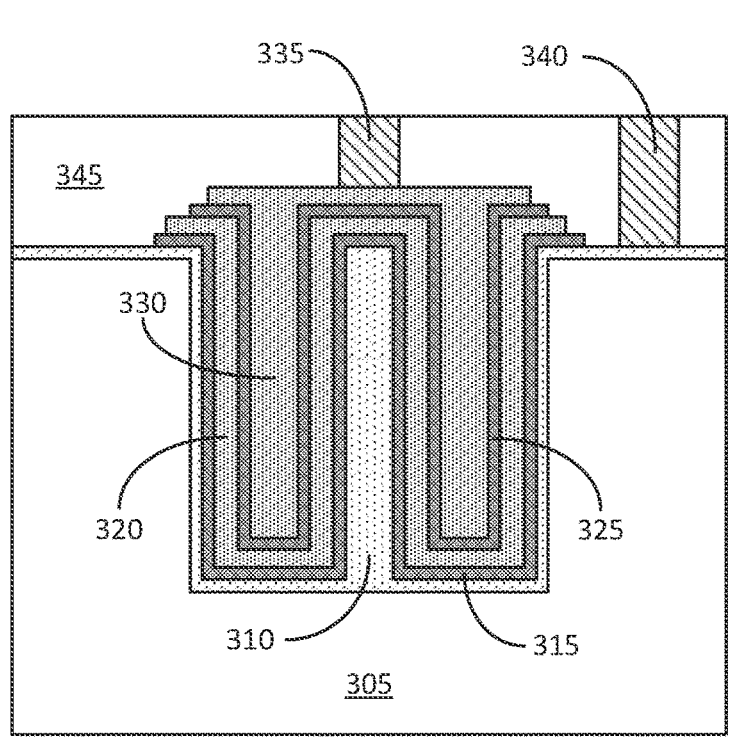
FIG. 3 illustrates a cross-sectional view of an example deep trench capacitor (DTC) in accordance with another aspect of the disclosure.

FIG. 3 illustrates a cross-sectional view of an example deep trench capacitor (DTC) 300 in accordance with another aspect of the disclosure. The DTC 300 may be an example of any of the decoupling capacitors discussed herein. In particular, the DTC 300 includes a substrate (e.g., silicon or p-doped silicon substrate) 305, a well (e.g., an n-doped well) 310 formed at least partially within the substrate 305, a first (lower) dielectric layer (e.g., silicon dioxide ($SiO_2$) or silicon nitride ($Si_3N_4$)) 315 formed at least partially within the well 310, a first (lower) polysilicon layer 320 disposed over the first dielectric layer 315 at least partially within the well 310, a second (upper) dielectric layer (e.g., $SiO_2$ or $Si_3N_4$)

325 disposed over the first polysilicon layer 320 at least partially within the well 310, and a second (upper) polysilicon layer 330 disposed over the second dielectric layer 325 at least partially within the well 310.

The DTC 300 may include a first metal electrode or terminal 335 (e.g., a metallized via hole through an insulating layer 345) disposed over and electrically coupled to the second (upper) polysilicon layer 330. Further, the DTC 300 may include a second metal electrode or terminal 340 (e.g., a metallized via hole through the insulating layer 345) disposed and electrically coupled to the well 310. The first metal electrode or terminal 335 may be the upper plate of the decoupling capacitor, which may be electrically coupled to the corresponding voltage bus, and the second metal electrode or terminal may be the bottom plate of the decoupling capacitor electrically coupled to ground.

An issue with the PDN 200 previously discussed is that typically the sets of decoupling capacitors $C_{11}$-$C_{14}$ and $C_{21}$-$C_{24}$ coupled to the Vdd_io and Vdd_gpu voltage busses 250-1 and 250-2 are typically fixed once the corresponding product is shipped. If the number of decoupling capacitors coupled to a voltage bus is not sufficient to properly mitigate voltage transients on the bus due to different load demands from the corresponding core, such voltage transients may impact the operation of the core and the corresponding SoC. Such PDN 200 may be designed to increase the number of decoupling capacitors coupled to a bus to improve the stability of the supply voltage, but that would consume more chip, package, and PCB area, which may not be desirable.

Figure 4:
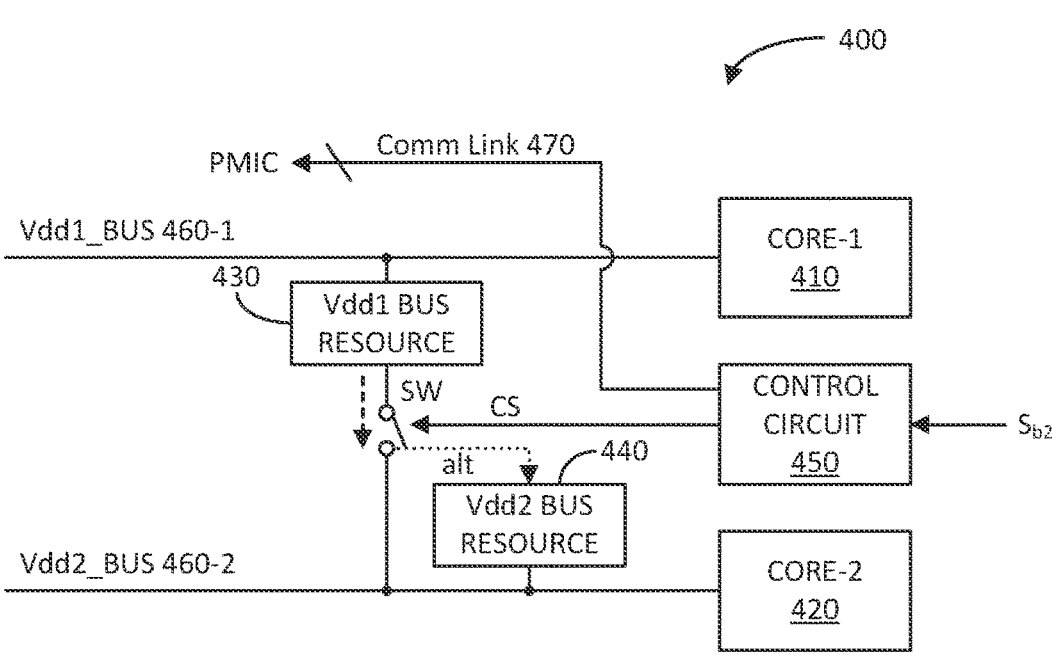
FIG. 4 illustrates a block diagram of an example cross-domain bus resource sharing power delivery network (PDN) in accordance with another aspect of the disclosure.

FIG. 4 illustrates a block diagram of an example cross-domain bus resource sharing power delivery network (PDN) 400 in accordance with another aspect of the disclosure. A concept herein is that if a voltage bus is experiencing or is about to experience high load demands that produce or likely to produce voltage transient, the voltage bus may temporarily borrow voltage transient mitigation resources from another voltage bus to better mitigate the actual or predicted voltage transient. Once the high load demand has ended, subsided, or is no longer a factor, the voltage transient mitigation resources may be returned to the sharing voltage bus. Thus, the PDN 400 may provide improved voltage transient mitigation for voltage buses through this bus resource borrowing/sharing technique without increasing the number of transient mitigating resources on each bus.

In particular, the PDN 400 includes a first core-1 (e.g., subsystem or circuit) 410, a second core-2 (e.g., subsystem or circuit) 420, a first voltage bus Vdd1_BUS 460-1 coupled to the first core-1 410, and a second voltage bus Vdd2_BUS 460-2 coupled to the second core-2 420. The PDN 400 further includes a first (Vdd1) voltage bus resource 430 coupled to the first voltage bus Vdd1_BUS 460-1, and a second (Vdd2) voltage bus resource 440 coupled to the second voltage bus Vdd2_BUS 460-2. As discussed in more detail further herein, each of the voltage bus resources 430 and 440 may include one or more decoupling capacitors, one or more clamps, electrostatic discharge (ESD) circuit (e.g., one or more ESD diodes), the corresponding supply voltage, and/or other transient mitigating bus resources.

The PDN 400 may further include a control circuit 450 and at least one switching device SW. The control circuit 450 may be configured to receive a signal $S_{b2}$ indicating whether the supply voltage Vdd2 on the second voltage bus Vdd2_BUS 460-2 is being impacted (e.g., subjected to a voltage transient) or may be predictably impacted (e.g., an upcoming high load demand interval). Based on the signal $S_{b2}$ indicating no such actual or predicted impact on the supply voltage Vdd2 on the second voltage bus Vdd2_BUS 460-2 (e.g., default configuration or mode), the control circuit 450 generates a (e.g., deasserted) control signal CS to open the at least one switching device SW. In such default configuration or mode, the Vdd1 bus resource 430 of the first voltage bus Vdd1_BUS 460-1 is not shared with the second voltage bus Vdd2_BUS 460-2. In other words, the bus resources 430 and 440 deal with providing supply voltage stability and mitigating voltage transients on their assigned first and second voltage busses Vdd1_BUS 460-1 and Vdd2_BUS 460-2, respectively.

Based on the signal $S_{b2}$ indicating an actual or predicted impact on the supply voltage Vdd2 on the second voltage bus Vdd2_BUS 560-2 (e.g., share/borrow configuration or mode), the control circuit 450 generates the (e.g., asserted) control signal CS to close the at least one switching device SW so that the Vdd1 bus resource 430 of the first voltage bus Vdd1_BUS 460-1 is provided to the second voltage bus Vdd2_BUS 460-2 (as indicated by the dashed arrow) directly or via the Vdd2 bus resource 440 to better mitigate the impact or predicted impact on the supply voltage Vdd2 on the second voltage bus Vdd2_BUS 460-2. Once the signal $S_{b2}$ indicates that the actual or predicted impact on the supply voltage has ended, subsided, or is no longer a factor, the control circuit 450 generates the (e.g., deasserted) control signal CS to open the at least one switching device SW to return the Vdd1 bus resource 430 to the first voltage bus Vdd1_BUS 460-1 per the default configuration or mode.

The PDN 400 may optionally include a communication link (e.g., I$^2$S, or other) 470 from the control circuit 450 to the corresponding PMIC (e.g., PMIC 110) to inform it of the bus resource sharing/borrowing event. The PMIC may use such information to modify its operations with respect to the supply voltages Vdd1 and Vdd2 for the first and/or second voltage buses 460-1 and 460-2, respectively. For example, if there are frequent supply voltage impacting events for the second voltage bus 460-2, the PMIC may provide additional resources on the second voltage bus 460-2, as well as additional sharing resources for the first voltage bus 460-1 (e.g., increase its supply voltage). Although not explicitly shown in other PDNs described herein, such communication link 470 may be provided in such PDNs as well.

Although, in this example, the power domain of the first core-1 410 is sharing its Vdd1 bus resource 430 with the power domain of the second core-2 420 (e.g., cross-domain resource sharing), it shall be understood that the PDN 400 may be configured to selectively implement bidirectional bus resource sharing between the first and second power domains, where the Vdd2 bus resource 440 may be shared with the first voltage bus Vdd1_BUS 460-1.

Figure 5:
FIG. 5 illustrates a block/schematic diagram of an example cross-domain decoupling capacitor sharing power delivery network (PDN) in accordance with another aspect of the disclosure.
Figure 5:
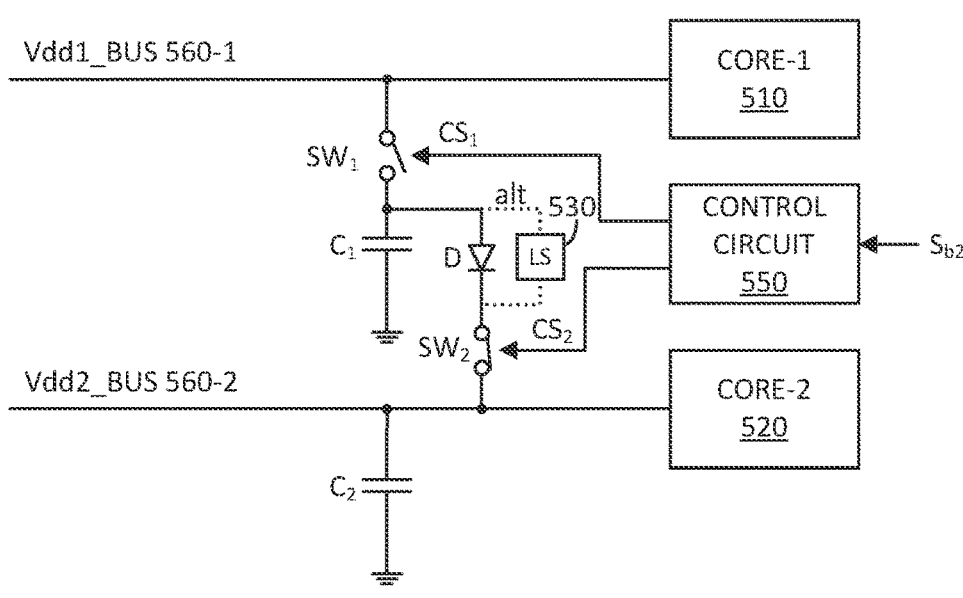

FIG. 5 illustrates a block/schematic diagram of an example cross-domain decoupling capacitor sharing power delivery network (PDN) 500 in accordance with another aspect of the disclosure. The PDN 500 may be an example of a specific implementation of the PDN 400 previously discussed. In this example, the voltage bus resource that is being shared/borrowed is one or more decoupling capacitors.

In particular, the PDN 500 includes a first core-1 (e.g., subsystem or circuit) 510, a second core-2 (e.g., subsystem or circuit) 520, a first voltage bus Vdd1_BUS 560-1 coupled to the first core-1 510, and a second voltage bus Vdd2_BUS 560-2 coupled to the second core-2 520. The PDN 500 further includes a first set of one or more decoupling capacitors $C_1$ including a top plate or terminal selectively coupled to the first voltage bus Vdd1_BUS 560-1 via a first switching device $SW_1$, and selectively coupled to the second voltage bus Vdd2_BUS 560-2 via an optional diode D or a voltage level shifter (LS) 530 and a second switching device $SW_2$. The first set of one or more decoupling capacitors $C_1$ includes a bottom plate or terminal coupled to ground. The PDN 500 further includes a second set of one or more capacitors $C_2$ coupled between the second voltage rail Vdd2_BUS 560-2 and ground. The first and second sets of one or more decoupling capacitors $C_1$ and $C_2$ may be one or more on-chip capacitors, one or more IC package (off-chip) capacitors, and/or one or more PCB (off-chip and off-package) capacitors.

The PDN 500 may further include a control circuit 550 configured to receive a signal $S_{b2}$ indicating whether the supply voltage Vdd2 on the second voltage bus Vdd2_BUS 560-2 is being impacted (e.g., subjected to a voltage transient) or may be predictably impacted (e.g., an upcoming high load demand time interval). Based on the signal $S_{b2}$ indicating no such actual or predicted impact on the supply voltage Vdd2 on the second voltage bus Vdd2_BUS 560-2 (e.g., default configuration or mode), the control circuit 550 generates a first (e.g., asserted) control signal $CS_1$ to close the first switching device $SW_1$ and a second (e.g., deasserted) control signal $CS_2$ to open the second switching device $SW_2$. In such default configuration or mode, the first set of one or more decoupling capacitors $C_1$ is coupled to the first voltage bus Vdd1_BUS 560-1, and decoupled from the second voltage bus Vdd2_BUS 560-2. Thus, the first set of one or more decoupling capacitors $C_1$ is mitigating voltage transients and providing stability to the supply voltage Vdd1 on the first voltage bus Vdd1_560-1.

Based on the signal $S_{b2}$ indicating an actual or predicted impact on the supply voltage Vdd2 on the second voltage bus Vdd2_BUS 560-2 (e.g., share/borrow configuration or mode), the control circuit 550 generates the first (e.g., deasserted) control signal $CS_1$ to open the first switching device $SW_1$ and the second (e.g., asserted) control signal $CS_2$ to close the second switching device $SW_2$. In such share/borrow configuration or mode, the first set of one or more decoupling capacitors $C_1$ is decoupled from the first voltage bus Vdd1_BUS 560-1, and coupled to the second voltage bus Vdd2_BUS 560-2 to assist the second set of one or more decoupling capacitors $C_2$ in mitigating voltage transient and providing stability to the supply voltage Vdd2 on the second voltage bus Vdd2_BUS 560-2. Then, based on the signal $S_{b2}$ indicating that the actual or predicted impact on the supply voltage Vdd2 has ended, subsided, or is no longer a factor, the control circuit 550 generates the first (e.g., asserted) control signal $CS_1$ to close the first switching device $SW_1$ and the second (e.g., deasserted) control signal $CS_2$ to open the second switching device $SW_2$ to reconfigure the PDN 500 back to the default configuration or mode.

The supply voltage Vdd1 on the first voltage bus Vdd1_BUS 560-1 (e.g., the sharing voltage bus) should be substantially the same or higher than the supply voltage Vdd2 on the second voltage bus Vdd2_BUS 560-2 (e.g., the borrowing voltage bus) to improve the transient mitigation on the second voltage bus Vdd2_BUS 560-2. The optional diode D or level shifter (LS) 530 may provide an appropriate voltage drop and unidirectional current for a smooth sharing of the decoupling capacitor $C_1$ with the second voltage bus Vdd2_BUS 560-2.

Although, in this example, the power domain of the first core-1 510 is sharing its first set of one or more decoupling capacitors $C_1$ with the power domain of the second core-2 520 (e.g., cross-domain resource sharing), it shall be understood that the PDN 500 may be configured to selectively implement bidirectional bus resource (e.g., decoupling capacitors) sharing between the first and second power domains (e.g., the second set of one or more decoupling capacitors $C_2$ may be selectively coupled to the first voltage bus Vdd1_BUS 560-1, and decoupled from the second voltage bus Vdd2_BUS 560-2).

Figure 6:
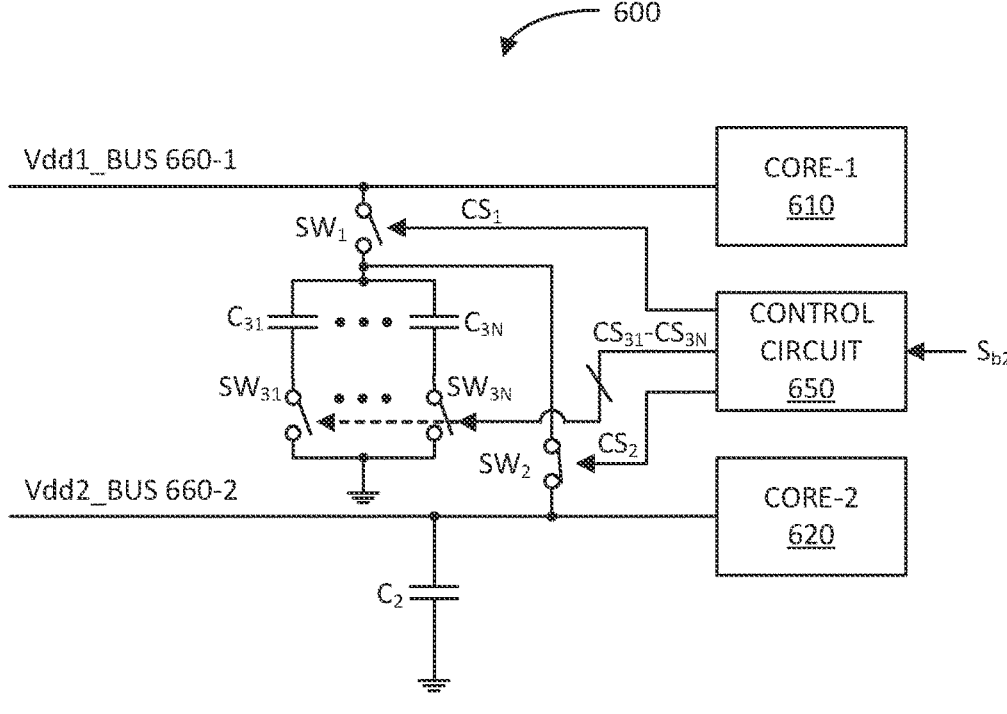
FIG. 6 illustrates a block/schematic diagram of another example cross-domain decoupling capacitor sharing power delivery network (PDN) in accordance with another aspect of the disclosure.

FIG. 6 illustrates a block/schematic diagram of another example cross-domain decoupling capacitor sharing power delivery network (PDN) 600 in accordance with another aspect of the disclosure. The PDN 600 is a variation of PDN 500 previously discussed, and includes many of the same/similar elements as indicated by the same reference indicators and numbers but with the most significant digit being a "6" for PDN 600 instead of a "5" as in PDN 500. The PDN 600 differs from PDN 500 in that PDN 600 includes a selectable bank of decoupling capacitors $C_{31}$ to $C_{3N}$ pertaining to the power domain of the first voltage bus Vdd1_BUS 660-1 that may be shared with (borrowed by) the power domain of the second voltage bus Vdd2_BUS 660-2.

More specifically, the set of decoupling capacitors $C_{31}$ to $C_{3N}$ are coupled in series with a set of switching devices $SW_{31}$ to $SW_{3N}$ between the first switching device $SW_1$ and ground, respectively. The control circuit 650 is configured to generate a set of control signals $CS_{31}$ to $CS_{3N}$ separately control the open/closed states of the set of switching devices $SW_{31}$ to $SW_{3N}$, respectively. For example, in default configuration or mode as indicated by signal $S_{b2}$, the control circuit 650 may generate the control signals $CS_1$, $CS_2$, and $CS_{31}$-$CS_{3N}$ to close the first switching device $SW_1$, to close the set of switching devices $SW_{31}$ to $SW_{3N}$, and to open the second switching device $SW_2$. In this default configuration or mode, the bank of decoupling capacitors $C_{31}$ to $C_{3N}$ are fully coupled to the first voltage bus Vdd1_BUS 660-1 to deal with voltage transient in the first supply voltage Vdd1. It shall be understood that, in default configuration or mode, less than the entire set of decoupling capacitors $C_{31}$ to $C_{3N}$ may be coupled to the voltage bus Vdd1_BUS 660-1 by keeping one or more of the set of switching devices $SW_{31}$ to $SW_{3N}$ open.

Based on the signal $S_{b2}$ indicating an actual or predicted voltage transient on the supply voltage Vdd2 on the second voltage bus Vdd2_BUS 660-2, the control circuit 650 may generate the generate the control signals $CS_1$, $CS_2$, and $CS_{31}$-$CS_{3N}$ to open the first switching device $SW_1$, to close one or more of the set of switching devices $SW_{31}$ to $SW_{3N}$, and to close the second switching device $SW_2$. In this share/borrow configuration or mode, one or more of the bank of decoupling capacitors $C_{31}$ to $C_{3N}$ are coupled to the second voltage bus Vdd1_BUS 660-2 to assist the second set of one or more decoupling capacitors $C_2$ in mitigating the voltage transients in the second supply voltage Vdd2.

The number of switching devices $SW_{31}$ to $SW_{3N}$ that are closed may be based on different conditions (e.g., the voltage difference between Vdd1 and Vdd2), and may also be dynamic. For example, if the signal $S_{b2}$ indicates a fairly mild voltage transient on the second voltage bus Vdd2_BUS 660-2, the control circuit 650 may generate the control signal $CS_{31}$-$CS_{3N}$ to close only one or a few of the switching devices $SW_{31}$ to $SW_{3N}$ so that the corresponding one or few decoupling capacitors $C_{31}$ to $C_{3N}$ are coupled to the second voltage bus Vdd2_BUS 660-2 to mitigate the mild voltage transient on the second voltage bus Vdd2_BUS 660-2. Conversely, if the signal $S_{b2}$ indicates an aggressive voltage transient on the second voltage bus Vdd2_BUS 660-2, the control circuit 650 may generate the control signal $CS_{31}$-$CS_{3N}$ to close most or all of the switching devices $SW_{31}$ to $SW_{3N}$ so that the corresponding most or all of the decoupling capacitors $C_{31}$ to $C_{3N}$ are coupled to the second voltage bus Vdd2_BUS 660-2 to mitigate the harsh voltage transient on the second voltage bus Vdd2_BUS 660-2.

As mentioned, the coupling of the set of decoupling capacitors $C_{31}$ to $C_{3N}$ by closing the corresponding set of switching devices $SW_{31}$ to $SW_{3N}$ may be dynamic. For example, during a Vdd2 transient mitigation event, the control circuit 650 may generate the control signal $CS_{31}$-$CS_{3N}$ to progressively close the set of switching devices $SW_{31}$ to $SW_{3N}$ to provide a smooth progressive coupling of the set of decoupling capacitors $C_{31}$ to $C_{3N}$ to the second voltage bus Vdd2_BUS 660-2. When the signal $S_{b2}$ indicates that the transient mitigation event has ended, subsided, or is no longer a factor, the control circuit 650 may generate the control signal $CS_{31}$-$CS_{3N}$ to progressively open the set of switching devices $SW_{31}$ to $SW_{3N}$ to provide a smooth progressive decoupling of the set of decoupling capacitors $C_{31}$ to $C_{3N}$ from the second voltage bus Vdd2_BUS 660-2. Further, based on the signal $S_{b2}$ indicating that the transient mitigation event has ended, subsided, or is no longer a factor, the control circuit 650 may generate the control signals $CS_1$, $CS_2$, and $CS_{31}$-$CS_{3N}$ to close the switching device $SW_1$, open the switching device $SW_2$, and close the number of switching devices $SW_{31}$ to $SW_{3N}$ pursuant to the default configuration or mode.

Although, in this example, the power domain of the first core-1 610 is sharing its selectable bank of decoupling capacitors $C_{31}$ to $C_{3N}$ with the power domain of the second core-2 620 (e.g., cross-domain resource sharing), it shall be understood that the PDN 600 may be configured to selectively implement bidirectional bus resource (e.g., bank of selectable decoupling capacitors) sharing between the first and second power domains (e.g., the second set of one or more decoupling capacitors $C_2$ may be implemented as a selectable bank of decoupling capacitors, which may be selectively coupled to the first voltage bus Vdd1_BUS 660-1, and decoupled from the second voltage bus Vdd2_BUS 660-2).

Figures 7, 8:
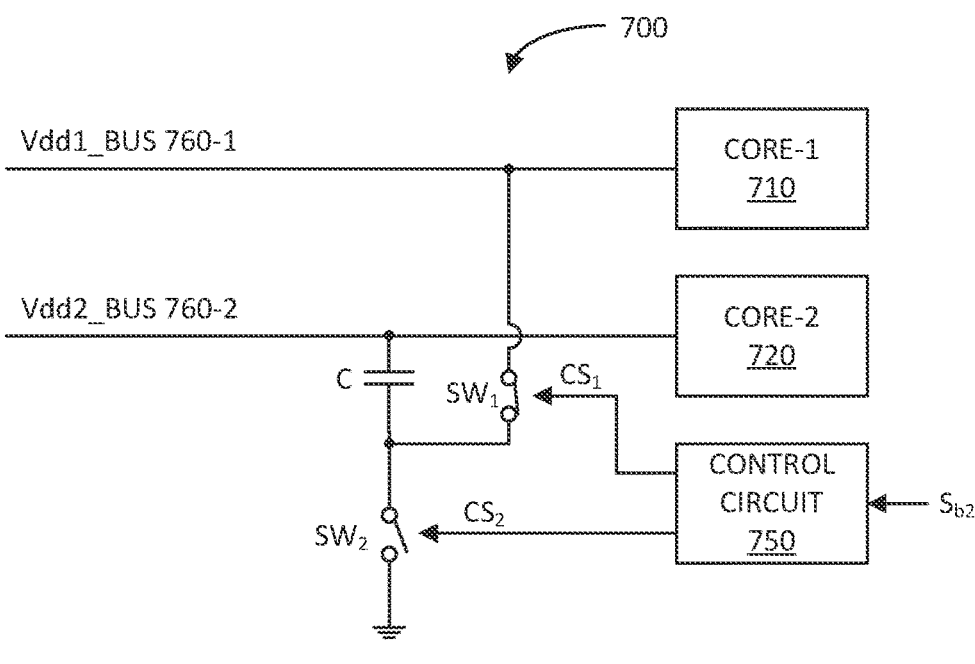
FIG. 7 illustrates a block/schematic diagram of an example cross-domain supply voltage sharing power delivery network (PDN) in accordance with another aspect of the disclosure.
FIG. 8 illustrates a block/schematic diagram of an example cross-domain voltage clamp sharing power delivery network (PDN) in accordance with another aspect of the disclosure.

FIG. 7 illustrates a block/schematic diagram of an example cross-domain supply voltage sharing power delivery network (PDN) 700 in accordance with another aspect of the disclosure. The PDN 700 may be an example of a specific implementation of the PDN 400 previously discussed. In this example, the voltage bus resource that is being shared/borrowed is the supply voltage itself.

In particular, the PDN 700 includes a first core-1 (e.g., subsystem or circuit) 710, a second core-2 (e.g., subsystem or circuit) 720, a first voltage bus Vdd1_BUS 760-1 coupled to the first core-1 710, and a second voltage bus Vdd2_BUS 760-2 coupled to the second core-2 720. The PDN 700 further includes a set of one or more decoupling capacitors C including a top plate or terminal coupled to the second voltage bus Vdd2_BUS 760-2. The set of one or more decoupling capacitors C may be one or more on-chip capacitors, one or more IC package (off-chip) capacitors, and/or one or more PCB (off-chip and off-package) capacitors. The PDN 700 further includes a first switching device $SW_1$ coupled between the first voltage bus Vdd1_BUS 760-1 and a bottom plate of the set of one or more decoupling capacitors C. Additionally, the PDN 700 includes a second switching device $SW_2$ coupled between the bottom plate of the set of one or more decoupling capacitors C and ground.

The PDN 700 may further include a control circuit 750 configured to receive a signal $S_{b2}$ indicating whether the supply voltage Vdd2 on the second voltage bus Vdd2_BUS 760-2 is being impacted (e.g., subjected to a voltage transient) or may be predictably impacted (e.g., an upcoming high load demand time interval). Based on the signal $S_{b2}$ indicating no such actual or predicted impact on the supply voltage Vdd2 on the second voltage bus Vdd2_BUS 760-2 (e.g., default configuration or mode), the control circuit 750 generates a first (e.g., deasserted) control signal $CS_1$ to open the first switching device $SW_1$ and a second (e.g., asserted) control signal $CS_2$ to close the second switching device $SW_2$. In such default configuration or mode, the first supply voltage Vdd1 of the first voltage bus Vdd1_BUS 760-1 is not shared with the second voltage bus Vdd2_BUS 760-2, and the set of one or more capacitors C each operate as a decoupling capacitor.

Based on the signal $S_{b2}$ indicating an actual or predicted impact on the supply voltage Vdd2 on the second voltage bus Vdd2_BUS 760-2 (e.g., share/borrow configuration or mode), the control circuit 750 generates the first (e.g., asserted) control signal $CS_1$ to close the first switching device $SW_1$ and the second (e.g., deasserted) control signal $CS_2$ to open the second switching device $SW_2$. In such share/borrow configuration or mode, the first supply voltage Vdd1 is provided to the bottom plate of the set of one or more capacitors C to boost the second supply voltage Vdd2 on the second voltage bus Vdd2_BUS 760-2 by the first supply voltage Vdd1 to assist in mitigating the voltage transient on the second voltage bus Vdd2_BUS 760-2. In such case, each of the set of one or more capacitors C has been reconfigured as a voltage boosting capacitor.

Then, based on the signal $S_{b2}$ indicating that the actual or predicted impact on the supply voltage Vdd2 has ended, subsided, or no longer a factor, the control circuit 750 generates the first (e.g., deasserted) control signal $CS_1$ to open the first switching device $SW_1$ and the second (e.g., asserted) control signal $CS_2$ to close the second switching device $SW_2$ to reconfigure the PDN 700 back to the default configuration or mode.

Although, in this example, the power domain of the first core-1 710 is sharing its supply voltage Vdd1 with the power domain of the second core-2 720 (e.g., cross-domain resource sharing), it shall be understood that the PDN 700 may be configured to selectively implement bidirectional bus resource (e.g., supply voltage) sharing between the first and second power domains (e.g., the supply voltage Vdd2 selectively provided to the first voltage bus Vdd1_BUS 760-1).

FIG. 8 illustrates a block/schematic diagram of an example cross-domain voltage clamp sharing power delivery network (PDN) 800 in accordance with another aspect of the disclosure. The PDN 800 may be an example of a specific implementation of the PDN 400 previously discussed. In this example, the voltage bus resource that is being shared/borrowed is a voltage clamp.

In particular, the PDN 800 includes a first core-1 (e.g., subsystem or circuit) 810, a second core-2 (e.g., subsystem or circuit) 820, a first voltage bus Vdd1_BUS 860-1 coupled to the first core-1 810, and a second voltage bus Vdd2_BUS 860-2 coupled to the second core-2 820. The PDN 800 further includes a voltage clamp 830 selectively coupled to the first voltage bus Vdd1_BUS 860-1 via a first switching device $SW_1$, and selectively coupled to the second voltage bus Vdd2_BUS 860-2 via a second switching device $SW_2$. The voltage clamp 830 is coupled between the first and second switching devices $SW_1$ and $SW_2$ and ground.

The PDN 800 may further include a control circuit 850 configured to receive a signal $S_{b2}$ indicating whether the supply voltage Vdd2 on the second voltage bus Vdd2_BUS 860-2 is being impacted (e.g., subjected to a voltage transient) or may be predictably impacted (e.g., an upcoming high load demand time interval). Based on the signal $S_{b2}$ indicating no such actual or predicted impact on the supply voltage Vdd2 on the second voltage bus Vdd2_BUS 860-2 (e.g., default configuration or mode), the control circuit 850 generates a first (e.g., asserted) control signal $CS_1$ to close the first switching device $SW_1$ and a second (e.g., deasserted) control signal $CS_2$ to open the second switching device $SW_2$. In such default configuration or mode, the voltage clamp 830 is coupled to the first voltage bus Vdd1_BUS 860-1, and decoupled from the second voltage bus Vdd2_BUS 860-2. Thus, the voltage clamp 830 may mitigate voltage transients (e.g., spikes or overshoots) in the supply voltage Vdd1 on the first voltage bus Vdd1_BUS 860-1.

Based on the signal $S_{b2}$ indicating an actual or predicted impact on the supply voltage Vdd2 on the second voltage bus Vdd2_BUS 860-2 (e.g., share/borrow configuration or mode), the control circuit 850 generates the first (e.g., deasserted) control signal $CS_1$ to open the first switching device $SW_1$ and the second (e.g., asserted) control signal $CS_2$ to close the second switching device $SW_2$. In such share/borrow configuration or mode, the voltage clamp 830 is decoupled from the first voltage bus Vdd1_BUS 860-1, and coupled to the second voltage bus Vdd2_BUS 860-2 to assist in mitigating voltage transients (e.g., spikes or overshoots) and provide stability to the supply voltage Vdd2 on the second voltage bus Vdd2_BUS 860-2. Then, based on the signal $S_{b2}$ indicating that the actual or predicted impact on the supply voltage Vdd2 has ended, subsided, or is no longer a factor, the control circuit 850 generates the first (e.g., asserted) control signal $CS_1$ to close the first switching device $SW_1$ and the second (e.g., deasserted) control signal $CS_2$ to open the second switching device $SW_2$ to reconfigure the PDN 800 back to the default configuration or mode.

Although, in this example, the power domain of the first core-1 810 is sharing its voltage clamp 830 with the power domain of the second core-2 820 (e.g., cross-domain resource sharing), it shall be understood that the PDN 800 may be configured to selectively implement bidirectional bus resource (e.g., voltage clamp) sharing between the first and second power domains (e.g., a voltage clamp assigned to the second voltage bus Vdd2_BUS 860-2 selectively coupled to the first voltage bus Vdd1_BUS 860-1 and decoupled from the second voltage bus Vdd2_BUS 860-2).

Figure 9:
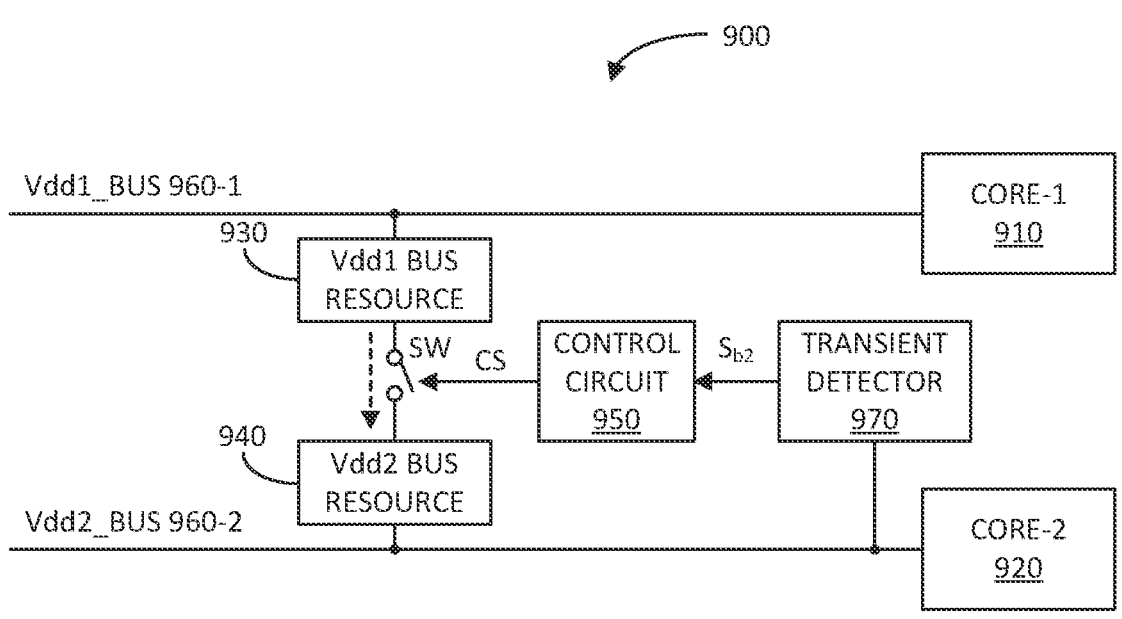
FIG. 9 illustrates a block diagram of an example cross-domain bus resource sharing with voltage transient detection power delivery network (PDN) in accordance with another aspect of the disclosure.

FIG. 9 illustrates a block diagram of an example cross-domain bus resource sharing with voltage transient detection power delivery network (PDN) 900 in accordance with another aspect of the disclosure. The PDN 900 is a variation of PDN 400 previously discussed, and includes many of the same/similar elements as indicated by the same reference indicators and numbers but with the most significant digit being a "9" for PDN 900 instead of a "4" as in PDN 400.

The PDN 900 further includes a voltage transient detector 970 configured to detect a voltage transient on the second voltage bus Vdd2_BUS 960-2. In this regard, the voltage transient detector 970 includes an input coupled to the second voltage bus Vdd2_BUS 960-2, and an output coupled to an input of the control circuit 950 to provide the signal $S_{b2}$ thereto. In this example, the signal $S_{b2}$ may indicate an actual voltage transient occurring on the second voltage bus Vdd2_BUS 960-2, as opposed to a predicted voltage transient.

Accordingly, if the voltage transient detector 970 does not detect a voltage transient on the second voltage bus Vdd2_BUS 960-2, the voltage transient detector 970 generates the (e.g., deasserted) signal $S_{b2}$. In response, the control circuit 950 generates the (e.g., deasserted) control signal CS to open the at least one switching device SW per the default configuration or mode. If the voltage transient detector 970 detects a voltage transient on the second voltage bus Vdd2_BUS 960-2, the voltage transient detector 970 generates the (e.g., asserted) signal $S_{b2}$. In response, the control circuit 950 generates the (e.g., asserted) control signal CS to close the at least one switching device SW to couple the Vdd1 bus resource to the second voltage bus Vdd2_BUS 960-2 to mitigate the voltage transient per the share/borrow configuration or mode. Once the transient is no longer present on the second voltage bus Vdd2_BUS 960-2, the voltage transient detector 970 may deassert the signal $S_{b2}$; and in response, the control circuit 950 generates the (e.g., deasserted) control signal CS to open the at least one switching device SW to return back to the default configuration or mode.

Although, in this example, the power domain of the first core-1 910 is sharing its Vdd1 bus resource 930 with the power domain of the second core-2 920 (e.g., cross-domain resource sharing), it shall be understood that the PDN 900 may be configured to selectively implement bidirectional bus resource sharing between the first and second power domains. For example, the PDN 900 may include another voltage transient detector including an input coupled to the first voltage bus Vdd1_BUS 960 to detect transient thereon, and an output coupled to the control circuit 950 to provide a signal $S_{b1}$ indicative of whether a voltage transient has been detected on the first voltage bus Vdd1_BUS 960. In response, the control circuit 950 may couple the Vdd2 bus resource 940 to the first voltage bus Vdd1_BUS 960.

Figure 10:
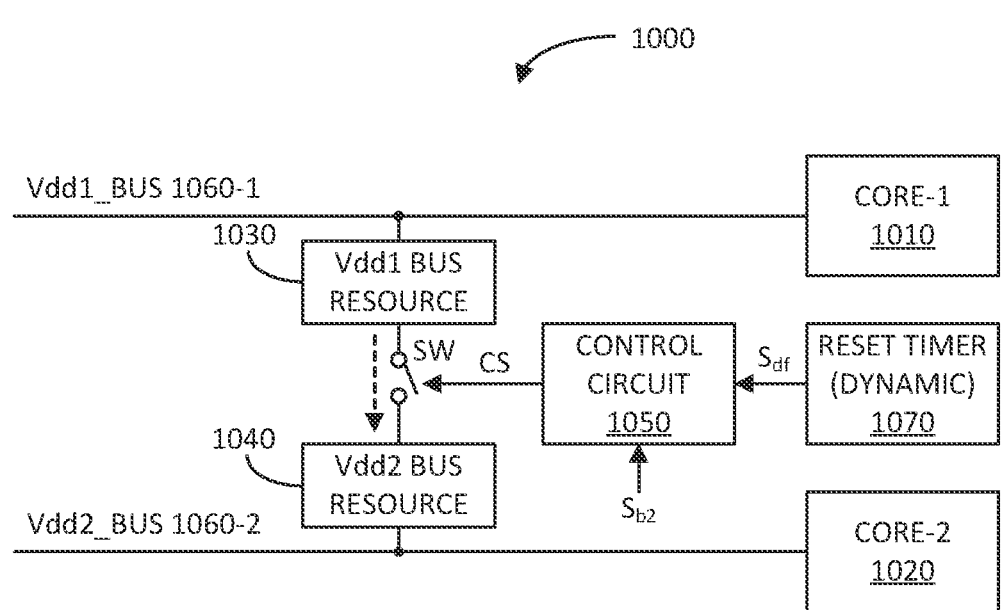
FIG. 10 illustrates a block/schematic diagram of an example cross-domain bus resource sharing with reset timer power delivery network (PDN) in accordance with another aspect of the disclosure.

FIG. 10 illustrates a block/schematic diagram of an example cross-domain bus resource sharing with reset timer power delivery network (PDN) 1000 in accordance with another aspect of the disclosure. The PDN 1000 is a variation of PDN 400 previously discussed, and includes many of the same/similar elements as indicated by the same reference indicators and numbers but with the most significant digit being a "10" for PDN 1000 instead of a "4" as in PDN 400.

The PDN 1000 further includes a reset timer 1070 configured to generate a signal $S_{df}$ to instruct the control circuit 1050 to reconfigure the PDN 1000 in default configuration or mode. Thus, after the share/borrow configuration or mode has been initiated via the asserted signal $S_{b2}$, the reset timer 1070 initiates a timer to keep track of the elapse time from the initiation of the share/borrow configuration or mode. When the elapse time reaches a reset threshold, the reset timer 1070 generates (e.g., asserts) the reset time signal $S_{df}$ to cause the control circuit 1050 to reconfigure the PDN 1000 in default configuration or mode. The reset threshold may be dynamic, and may depend on the voltage transient or the supply voltage Vdd2 on the second voltage bus Vdd2_BUS 1060-2, and/or may depend on the end of a predicted high load demand interval associated with the second core-2 1020.

Although, in this example, the power domain of the first core-1 1010 is sharing its Vdd1 bus resource 1030 with the power domain of the second core-2 1020 (e.g., cross-domain resource sharing), it shall be understood that the PDN 1000 may be configured to selectively implement bidirectional bus resource sharing between the first and second power domains. For example, the reset timer 1070 may dynamically set the reset threshold based on the voltage transient or the supply voltage Vdd1 on the first voltage bus Vdd1_BUS 1060-1, and/or the predicted high load demand interval associated with the first core-1 1010.

Figures 11A, 11B:
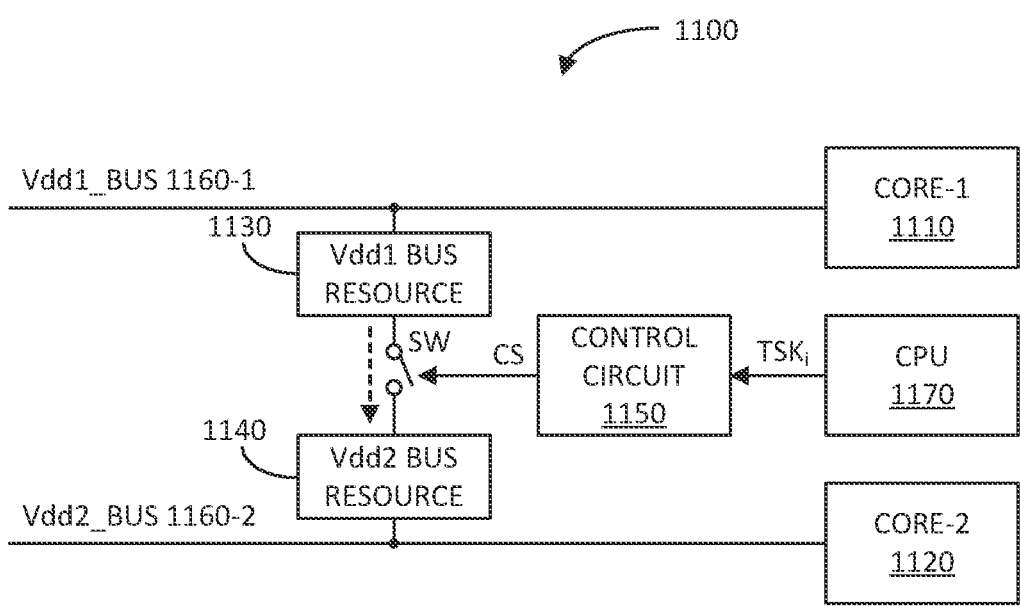
FIG. 11A illustrates a block diagram of an example task-based cross-domain bus resource sharing power delivery network (PDN) in accordance with another aspect of the disclosure.
FIG. 11B illustrates a task timing diagram associated with the example task-based cross-domain bus resource sharing power delivery network (PDN) of FIG. 11A in accordance with another aspect of the disclosure.

FIG. 11A illustrates a block diagram of an example task-based cross-domain bus resource sharing power delivery network (PDN) 1100 in accordance with another aspect of the disclosure. The PDN 1100 is a variation of PDN 400 previously discussed, and includes many of the same/similar elements as indicated by the same reference indicators and numbers but with the most significant digit being a "11" for PDN 1100 instead of a "4" as in PDN 400.

The PDN 1100 further includes a central processing unit (CPU) (or other core) 1170 configured to generate a signal TSK$_i$ indicating the tasks or workload of the first core-1 1110 and the second core-2 1120 (as well as other cores) for a following i$^{th}$ time interval. Based on the task signal TSK$_i$, the control circuit 1150 generates the control signal CS to configure the PDN 1100.

For example, if the task signal TSK$_i$ indicates that the task or workload of the second core-2 1120 for the i$^{th}$ time interval is none or requires a relatively small load demand, the control circuit 1150 generates the (e.g., deasserted) control signal CS to open the at least one switching device SW and not provide the Vdd1 bus resource 1130 to the second voltage bus Vdd2_BUS 1160-2 during the i$^{th}$ time interval per the default configuration or mode. If, on the other hand, the task signal TSK$_i$ indicates that the task or workload of the core-2 1120 for the i$^{th}$ time interval is significant or requires a relatively high load demand, the control circuit 1150 generates the (e.g., asserted) control signal CS to close the at least one switching device SW and provide the Vdd1 bus resource 1130 to the second voltage bus Vdd2_BUS 1160-2 during the i$^{th}$ time interval per the share/borrow configuration or mode.

Although, in this example, the power domain of the first core-1 1110 is sharing its Vdd1 bus resource 1130 with the power domain of the second core-2 1120 (e.g., cross-domain resource sharing), it shall be understood that the PDN 1100 may be configured to selectively implement bidirectional bus resource sharing between the first and second power domains. For example, if the task signal TSK$_i$ indicates that the first core-1 1110 will have a significant, relatively high load demand during the i$^{th}$ time interval, the Vdd2 bus resource 1140 may be provided to the first voltage bus Vdd1_BUS 1160-1 during the i$^{th}$ time interval per the share/borrow configuration or mode. The following describes a more concrete example of the task-based, cross-domain resource sharing of the PDN 1100.

FIG. 11B illustrates a task timing diagram associated with the example task-based cross-domain bus resource sharing power delivery network (PDN) 1100 in accordance with another aspect of the disclosure. The horizontal axis of the task diagram represents time with an i$^{th}$ time interval, followed by an (i+1)$^{th}$ time interval, and that followed by an (i+2)$^{th}$ time interval. As indicated by the time interval headings, the i$^{th}$ task signal TSK$_i$ indicates a frame transfer task, the (i+1)$^{th}$ task signal TSK$_{i+1}$ indicates a download task, and the (i+2)$^{th}$ task signal TSK$_{i+2}$ indicates a gaming task.

In this example, the associated SoC includes the following core (e.g., subsystem or circuit) power domains: a double data rate (DDR) memory domain VDD_DDR, a neural signal processor (NSP) domain VDD_NSP, a multimedia (MM) domain VDD_MM, an input/output (I/O) domain VDD_IO, a radio frequency (RF) domain VDD_RF, a graphics processing unit (GPU) domain VDD_GPU, and an SoC security domain VDD_SCR.

Depending on the current task, the following priorities related to sharing/borrowing bus resources may be assigned to the various power domains: (1) priority P0 is for critical domains, such as the SoC security domain VDD_SCR, that are not allowed to share or borrow bus resources regardless of the current task; (2) priority P1 is for domains that are currently performing an operation, and, as a result, are not allowed to share its bus resources, but may borrow bus resources from a priority P3 domain, as discussed further herein; (3) priority P2 is for domains that may not be currently performing an operation, but may be (e.g., sporadically) expected to do so, and, as a result, are not allowed to share its bus resources, but may borrow bus resources from a priority P3 domain; and (4) priority P3 is for domains that are not currently performing or expected to perform an operations.

Referring again to the task timing diagram of FIG. 11B, the frame transfer task of the i$^{th}$ time interval as indicated by the task signal TSK$_i$ involves a transfer of multimedia data from the DDR memory core to the multimedia core. Accordingly, the DDR memory domain VDD_DDR and the multimedia domain VDD_MM are assigned priority P1 as they are currently involved in the data transfer; the GPU domain VDD_GPU is assigned priority P2 as it may be called upon to process some of the transferred data; the NSP, I/O, and RF domains VDD_NSP, VDD_IO, and VDD_RF are assigned priority P3 as they are not currently performing or expected to perform any operation; and the SoC security domain VDD_SCR is assigned the fixed priority P0 as it is a critical domain. Accordingly, with reference to FIG. 11A, the sharing domain core-1 1110 may pertain to any of the P3 domains VDD_NSP, VDD_IO, and VDD_RF, and the borrowing domain core-2 1120 may pertain to any of the P1 domains VDD_DDR and VDD_MM.

Referring again to the task timing diagram of FIG. 11B, the download task of the (i+1)$^{th}$ time interval as indicated by the task signal TSK$_{i+1}$ involves a downloading of data. Accordingly, the DDR memory domain VDD_DDR, the multimedia domain VDD_MM, the I/O domain VDD_IO, and the RF domain VDD_RF are assigned priority P1 as they are currently involved in the downloading, transferring, and processing of the data; the GPU domain VDD_GPU is assigned priority P2 as it may be called upon to process some of the downloaded data; the NSP domain VDD_NSP is assigned priority P3 as it is not currently performing or expected to perform any operation; and the SoC security domain VDD_SCR is assigned the critical priority P0. Accordingly, with reference to FIG. 11A, the sharing domain core-1 1110 may pertain to the P3 domain VDD_NSP, and the borrowing domain core-2 1120 may pertain to any of the P1 domains VDD_DDR, VDD_MM, VDD_IO, and VDD_RF.

Referring again to the task timing diagram of FIG. 11B, the task of the (i+2)$^{th}$ time interval as indicated by the task signal TSK$_{i+2}$ involves gaming. Accordingly, the NSP domain VDD_NSP, the multimedia domain VDD_MM, the RF domain VDD_RF, and the GPU domain VDD_GPU are assigned priority P1 as they are currently involved in the gaming operation; the DDR memory domain VDD_DDR and the I/O domain VDD_IO are assigned priority P3 as they are not currently performing or expected to perform any operation; and the SoC security domain VDD_SCR is assigned the critical priority P0. Accordingly, with reference to FIG. 11A, the sharing domain core-1 1110 may pertain to any of the P3 domains VDD_DDR and VDD_IO, and the borrowing domain core-2 1120 may pertain to any of the P1 domains VDD_NSP, VDD_MM, VDD_RF, and VDD_GPU.

Figure 12:
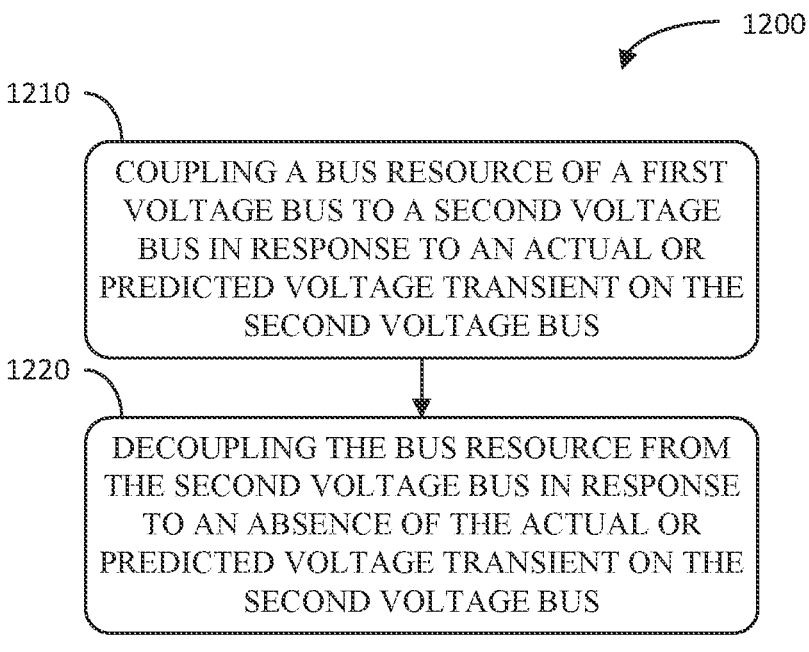
FIG. 12 illustrates a flow diagram of an example method of providing cross-domain power delivery in accordance with another aspect of the disclosure.

FIG. 12 illustrates a flow diagram of an example method 1200 of providing cross-domain power delivery in accordance with another aspect of the disclosure. The method 1200 includes coupling a bus resource of a first voltage bus to a second voltage bus in response to an actual or predicted voltage transient on the second voltage bus (block 1210). The method 1200 further includes decoupling the bus resource from the second voltage bus in response to an absence of the actual or predicted voltage transient on the second voltage bus (block 1220).

The following provides an overview of aspects of the present disclosure:

Aspect 1: An apparatus, comprising: a first core; a first voltage bus coupled to the first core; a second core; a second voltage bus coupled to the second core; a bus resource coupled or selectively coupled to the first voltage bus, and selectively coupled to the second voltage bus; and a control circuit configured to: couple the bus resource to the first voltage bus and decouple the bus resource from the second voltage bus based on a first signal indicating no actual or predicted voltage transient on the second voltage bus; and couple the bus resource to the second voltage bus based on the first signal indicating an actual or predicted voltage transient on the second voltage bus.

Aspect 2: The apparatus of aspect 1, wherein the first mode indicates an actual or predicted voltage transient on the second voltage bus, and the second mode indicates an absence of an actual or predicted voltage transient on the second voltage bus.

Aspect 3: The apparatus of aspect 1 or 2, wherein the bus resource comprises a set of one or more decoupling capacitors.

Aspect 4: The apparatus of aspect 3, wherein the set of one or more decoupling capacitors comprises one or more on-chip decoupling capacitors.

Aspect 5: The apparatus of aspect 3 or 4, wherein the set of one or more decoupling capacitors comprises one or more integrated circuit (IC) package decoupling capacitors.

Aspect 6: The apparatus of any one of aspects 3-5, wherein the set of one or more decoupling capacitors comprises one or more printed circuit board (PCB) decoupling capacitors.

Aspect 7: The apparatus of any one of aspects 3-6, wherein the set of one or more decoupling capacitors comprises one or more deep trench capacitors.

Aspect 8: The apparatus of any one of aspects 3-7, further comprising: a first switching device coupled between the set of one or more decoupling capacitors and the first voltage bus; and a second switching device coupled between the set of one or more decoupling capacitors and the second voltage bus; wherein the control circuit is configured to: close the first switching device and open the second switching device based on the first mode; and open the first switching device and close the second switching device based on the second mode.

Aspect 9: The apparatus of aspect 8, further comprising a diode or a voltage level shift circuit coupled in series with the second switching device between the set of one or more decoupling capacitors and the second voltage bus.

Aspect 10: The apparatus of aspect 8 or 9, wherein the set of one or more decoupling capacitors comprises a set of decoupling capacitors, and further comprising a set of switching devices coupled between the set of decoupling capacitors and ground, respectively, and wherein the control circuit is configured to open and close one or more of the set of switching devices based on the first or second mode.

Aspect 11: The apparatus of aspect 10, wherein the control circuit is configured to dynamically open and close a plurality of the set of switching devices based on the first or second mode.

Aspect 12: The apparatus of aspect 11, wherein the control circuit is configured to progressively close the plurality of the set of switching devices based on the first or second mode.

Aspect 13: The apparatus of aspect 11 or 12, wherein the control circuit is configured to progressively open the plurality of the set of switching devices based on the first or second mode.

Aspect 14: The apparatus of any one of aspects 1-13, wherein the bus resource comprises a voltage clamp or an electrostatic discharge (ESD) circuit.

Aspect 15: The apparatus of any one of aspects 1-14, wherein the bus resource comprises a first supply voltage on the first voltage bus.

Aspect 16: The apparatus of aspect 15, further comprising a circuit configured to boost a second supply voltage on the second voltage bus based on the first supply voltage.

Aspect 17: The apparatus of aspect 15 or 16, further comprising: a set of one or more capacitors each including an upper plate coupled to the second voltage bus; a first switching device coupled between the first voltage bus and a lower plate of each of the set of one or more capacitors; and a second switching device coupled between the lower plate of each of the set of one or more capacitors and ground; wherein the control circuit is configured to: open the first switching device and close the second switching device based on the first mode; and close the first switching device and open the second switching device based on the second mode.

Aspect 18: The apparatus of any one of aspects 1-17, further comprising a voltage transient detector including an input coupled to the second voltage bus, and an output coupled to the control circuit.

Aspect 19: The apparatus of any one of aspects 1-18, further comprising a reset timer configured to generate a signal related to an elapse time from the coupling of the bus resource to the second voltage bus, wherein the control circuit is configured to couple the bus resource to the first voltage bus and decouple the bus resource from the second voltage bus in response to the signal indicating that the elapse time has reached a reset threshold.

Aspect 20: The apparatus of aspect 19, wherein the reset threshold is dynamic.

Aspect 21: The apparatus of any one of aspects 1-20, wherein the control circuit is configured to couple the bus resource to the second voltage bus during a first time interval based on a signal indicating that the first core is assigned a first priority allowing the first core to share the bus resource during the first time interval, and the second core is assigned a second priority allowing the second core to borrow the bus resource from the first core during the first time interval.

Aspect 22: The apparatus of aspect 21, wherein the control circuit is restricted from coupling the bus resource to the second voltage bus during a second time interval based on the signal indicating that the first core is assigned the second priority during the second time interval.

Aspect 23: The apparatus of aspect 22, wherein the first priority indicates that a corresponding core is not performing a task during a corresponding time interval, and the second priority indicates that the corresponding core is performing a task during the corresponding time interval.

Aspect 24: The apparatus of any one of aspects 1-23, wherein the first voltage bus is configured to receive a first supply voltage, wherein the second voltage bus is configured to receive a second supply voltage, and wherein the first supply voltage is substantially the same or greater than the second supply voltage.

Aspect 25: A method, comprising: coupling a bus resource of a first voltage bus to a second voltage bus in response to an actual or predicted voltage transient on the second voltage bus; and decoupling the bus resource from the second voltage bus in response to an absence of the actual or predicted voltage transient on the second voltage bus.

Aspect 26: The method of aspect 25, wherein the bus resource comprises one or more decoupling capacitors.

Aspect 27: The method of aspect 25 or 26, wherein the bus resource comprises a supply voltage or a voltage clamp.

Aspect 28: An apparatus, comprising: a power management integrated circuit (PMIC) including first and second voltage regulators; a first voltage bus coupled to the first voltage regulator of the PMIC; a second voltage bus coupled to the second voltage regulator of the PMIC; a first core coupled to the first voltage bus; a second core coupled to the second voltage bus; a bus resource coupled or selectively coupled to the first voltage bus, and selectively coupled to the second voltage bus; and a control circuit configured to: couple the bus resource to the first voltage bus and decouple the bus resource from the second voltage bus based on a first mode; and couple the bus resource to the second voltage bus based on a second mode.

Aspect 29: The apparatus of aspect 28, further comprising a system on chip (SoC) comprising the first core, the second core, and the control circuit.

Aspect 30: An apparatus, comprising: a first core; a first voltage bus coupled to the first core; a second voltage bus coupled to the second core; a bus resource coupled or selectively coupled to the first voltage bus, and selectively coupled to the second voltage bus; and a control circuit configured to couple the bus resource to the first voltage bus and decouple the bus resource from the second voltage bus based on a first priority allowing the first core to share the bus resource and a second priority allowing the second core to borrow the bus resource from the first core.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed:
1. An apparatus, comprising:
a first core;
a first voltage bus coupled to the first core;
a second core;
a second voltage bus coupled to the second core;

a bus resource coupled or selectively coupled to the first voltage bus, and selectively coupled to the second voltage bus; and
a control circuit configured to:
    couple the bus resource to the first voltage bus and decouple the bus resource from the second voltage bus based on a first mode indicating an actual or predicted voltage transient on the first voltage bus; and
    couple the bus resource to the second voltage bus based on a second mode indicating an absence of an actual or predicted voltage transient on the second voltage bus.

2. The apparatus of claim 1, wherein the bus resource comprises a set of one or more decoupling capacitors.

3. The apparatus of claim 2, wherein the set of one or more decoupling capacitors comprises one or more on-chip decoupling capacitors.

4. The apparatus of claim 2, wherein the set of one or more decoupling capacitors comprises one or more integrated circuit (IC) package decoupling capacitors.

5. The apparatus of claim 2, wherein the set of one or more decoupling capacitors comprises one or more printed circuit board (PCB) decoupling capacitors.

6. The apparatus of claim 2, wherein the set of one or more decoupling capacitors comprises one or more deep trench capacitors.

7. The apparatus of claim 2, further comprising:
a first switching device coupled between the set of one or more decoupling capacitors and the first voltage bus; and
a second switching device coupled between the set of one or more decoupling capacitors and the second voltage bus;
wherein the control circuit is configured to:
    close the first switching device and open the second switching device based on the first mode; and
    open the first switching device and close the second switching device based on the second mode.

8. The apparatus of claim 7, further comprising a diode or a voltage level shift circuit coupled in series with the second switching device between the set of one or more decoupling capacitors and the second voltage bus.

9. The apparatus of claim 7, wherein the set of one or more decoupling capacitors comprises a set of decoupling capacitors, and further comprising a set of switching devices coupled between the set of decoupling capacitors and ground, respectively, and wherein the control circuit is configured to open and close one or more of the set of switching devices based on the first or second mode.

10. The apparatus of claim 9, wherein the control circuit is configured to dynamically open and close a plurality of the set of switching devices based on the first or second mode.

11. The apparatus of claim 10, wherein the control circuit is configured to progressively close the plurality of the set of switching devices based on the first or second mode.

12. The apparatus of claim 10, wherein the control circuit is configured to progressively open the plurality of the set of switching devices based on the first or second mode.

13. The apparatus of claim 1, wherein the bus resource comprises a voltage clamp or an electrostatic discharge (ESD) circuit.

14. The apparatus of claim 1, wherein the bus resource comprises a first supply voltage on the first voltage bus.

15. The apparatus of claim 14, further comprising a circuit configured to boost a second supply voltage on the second voltage bus based on the first supply voltage.

16. The apparatus of claim 14, further comprising:

a set of one or more capacitors each including an upper plate coupled to the second voltage bus;

a first switching device coupled between the first voltage bus and a lower plate of each of the set of one or more capacitors; and a second switching device coupled between the lower plate of each of the set of one or more capacitors and ground;

wherein the control circuit is configured to:

open the first switching device and close the second switching device based on the first mode; and close the first switching device and open the second switching device based on the second mode.

17. The apparatus of claim 1, further comprising a voltage transient detector including an input coupled to the second voltage bus, and an output coupled to the control circuit.

18. The apparatus of claim 1, further comprising a reset timer configured to generate a signal related to an elapse time from the coupling of the bus resource to the second voltage bus, wherein the control circuit is configured to couple the bus resource to the first voltage bus and decouple the bus resource from the second voltage bus in response to the signal indicating that the elapse time has reached a reset threshold.

19. The apparatus of claim 18, wherein the reset threshold is dynamic.

20. The apparatus of claim 1, wherein the control circuit is configured to couple the bus resource to the second voltage bus during a first time interval based on a signal indicating that the first core is assigned a first priority allowing the first core to share the bus resource during the first time interval, and the second core is assigned a second priority allowing the second core to borrow the bus resource from the first core during the first time interval.

21. The apparatus of claim 20, wherein the control circuit is restricted from coupling the bus resource to the second voltage bus during a second time interval based on the signal indicating that the first core is assigned the second priority during the second time interval.

22. The apparatus of claim 21, wherein the first priority indicates that a corresponding core is not performing a task during a corresponding time interval, and the second priority indicates that the corresponding core is performing a task during the corresponding time interval.

23. The apparatus of claim 1, wherein the first voltage bus is configured to receive a first supply voltage, wherein the second voltage bus is configured to receive a second supply voltage, and wherein the first supply voltage is substantially the same or greater than the second supply voltage.

24. An apparatus, comprising:

a power management integrated circuit (PMIC) including first and second voltage regulators;

a first voltage bus coupled to the first voltage regulator of the PMIC;

a second voltage bus coupled to the second voltage regulator of the PMIC;

a first core coupled to the first voltage bus;

a second core coupled to the second voltage bus;

a bus resource coupled or selectively coupled to the first voltage bus, and selectively coupled to the second voltage bus; and a control circuit configured to:

couple the bus resource to the first voltage bus and decouple the bus resource from the second voltage bus based on a first mode indicating an actual or predicted voltage transient on the first voltage bus; and couple the bus resource to the second voltage bus and decouple the bus resource from the first voltage bus based on a second mode indicating an absence of an actual or predicted voltage transient on the first voltage bus.

25. The apparatus of claim 24, further comprising a system on chip (SoC) comprising the first core, the second core, and the control circuit.

26. An apparatus, comprising:

a first core;

a first voltage bus coupled to the first core;

a second core;

a second voltage bus coupled to the second core;

a first bus resource coupled to the first voltage bus in a default mode;

a second bus resource coupled to the second voltage bus in the default mode; and a control circuit configured to couple the second bus resource to the first voltage bus and decouple the second bus resource from the second voltage bus based on a first priority allowing the first core to borrow the second bus resource and a second priority allowing the second core to share the second bus resource in response to an actual or predicted voltage transient on the first voltage bus.

27. The apparatus of claim 26, wherein the first priority prevents the control circuit to couple the first bus resource to the second voltage bus in the case of an actual or predicted voltage transient on the second voltage bus.

* * * * *